United States Patent
Areddu et al.

(10) Patent No.: US 8,494,128 B2
(45) Date of Patent: Jul. 23, 2013

(54) PERFORMANCE MONITORING IN A TELEPHONE NETWORK

(75) Inventors: Marco Areddu, Turin (IT); Virginia Moretti, Turin (IT); Riccardo Russo, Turin (IT)

(73) Assignee: Telecom Italia S.p.A., Milan (IT)

( * ) Notice: Subject to any disclaimer, the term of this patent is extended or adjusted under 35 U.S.C. 154(b) by 1246 days.

(21) Appl. No.: 12/308,708

(22) PCT Filed: Jun. 23, 2006

(86) PCT No.: PCT/EP2006/063504
§ 371 (c)(1),
(2), (4) Date: Dec. 22, 2008

(87) PCT Pub. No.: WO2007/147442
PCT Pub. Date: Dec. 27, 2007

(65) Prior Publication Data
US 2009/0310757 A1    Dec. 17, 2009

(51) Int. Cl.
*H04M 11/00* (2006.01)
*H04M 1/24* (2006.01)
*H04M 15/00* (2006.01)

(52) U.S. Cl.
USPC ...................................... 379/90.01

(58) Field of Classification Search
USPC ...... 379/15.05, 32.01–32.04, 112.01–112.06, 379/133–134, 32.01–32.02; 455/423, 424, 455/67.11
See application file for complete search history.

(56) References Cited

U.S. PATENT DOCUMENTS

| | | | |
|---|---|---|---|
| 5,999,604 A * | 12/1999 | Walter | 379/133 |
| 6,359,976 B1 * | 3/2002 | Kalyanpur et al. | 379/134 |
| 6,381,306 B1 | 4/2002 | Lawson et al. | |
| 6,529,594 B1 | 3/2003 | Brockman et al. | |
| 6,914,967 B1 | 7/2005 | Bača et al. | |
| 7,640,015 B2 * | 12/2009 | Connelly et al. | 455/423 |
| 7,773,727 B1 * | 8/2010 | Eslambolchi et al. | 379/14.01 |
| 2007/0004396 A1 * | 1/2007 | Connelly | 455/423 |

FOREIGN PATENT DOCUMENTS
WO    WO-01/20920 A1    3/2001

\* cited by examiner

*Primary Examiner* — George Eng
*Assistant Examiner* — Nam Huynh
(74) *Attorney, Agent, or Firm* — Finnegan, Henderson, Farabow, Garrett & Dunner, L.L.P.

(57) ABSTRACT

A method of monitoring performance of a telephone network, wherein the telephone network includes at least one exchange configured for collecting signaling messages, which are received at the at least one exchange and/or which are generated at the at least one exchange. The method includes acquiring from the exchange a set of signaling messages indicating unsuccessful call setup procedures relative to calls addressed to a plurality of destinations associating with each signaling message of the set of signaling messages respective destination information which is indicative of the destination of the unsuccessful call which generated the signaling message; and processing the set of signaling messages and the corresponding associated destination information, thus obtaining information relative to the unsuccessful call setup procedures according to call destinations.

17 Claims, 6 Drawing Sheets

PERFORMANCE MONITORING IN A TELEPHONE NETWORK

CROSS REFERENCE TO RELATED APPLICATION

This application is a national phase application based on PCT/EP2006/063504, filed Jun. 23, 2006, the content of which is incorporated herein by reference.

TECHNICAL FIELD

The present invention relates to the field of telephone networks. More particularly, the present invention relates to a method and device for monitoring telephone network performance, in particular by monitoring the outcome of call setup procedures.

BACKGROUND ART

As it is known, a telephone network such as the PSTN network ("Public Switched Telephone Network") or the PLMN network ("Public Land Mobile Network") generally comprises a plurality of exchanges interconnected by trunks. Exchange and trunk arrangements determine the network topology. A plurality of users may be connected to an exchange by means of respective terminals.

An exchange is in charge, inter alia, of routing calls from calling terminals to called terminals. More particularly, when a caller unhooks his terminal for making a call, the exchange to which the calling terminal (namely, the terminal of the caller) is connected detects the off hook condition of the calling terminal, and it sends it a dial tone. The caller then dials the callee number, i.e. the telephone number identifying the called terminal. The callee number may be transmitted to the exchange for instance through DMTF tones. Upon reception of the callee number, the exchange attempts to route the call towards the called terminal (possibly through other exchanges), by attempting to establish a connection between the calling terminal and the called terminal.

A connection may be either successfully established or not. In the affirmative, the call setup procedure is successful, while in the negative the call setup procedure is unsuccessful. In both cases, after the call setup procedure is concluded, an event indicating the end of the call setup procedure is generated by the telephone network, and a corresponding signaling message indicating the end of the call setup procedure is sent backward from the exchange which generated the event. The expression "signaling message" refers in general to a message which comprises measurement information generated by an exchange during a given measurement period. A signaling message may be formatted according to any known signaling protocol such as ISUP, SIP or the like.

The signaling message indicating the end of the call setup procedure is called "end of selection" signal (or briefly, EOS signal).

An EOS signal is generated by the telephone network for indicating the outcome of a call setup procedure, i.e. for indicating the successful completion or unsuccessful termination of the call setup procedure, and it may contain information of the called party's line condition.

In case of a successful call setup procedure, a "normal" EOS event is generated, and the conversation between the caller and the callee may begin. On the contrary, in case of unsuccessful call setup procedure, e.g. due to a congestion or a failure of the telephone network or due to the fact that the callee is already engaged in another call, an EOS event of a type other than "normal" is generated. The EOS event type mainly depends of the reason why the setup procedure is unsuccessful.

Known exchanges have an EOS processing function for processing EOS events received by other exchanges and performing consequent actions. For instance, in case of an unsuccessful call setup procedure due to the fact that there are no free resources in the network, e.g. no trunk available, an EOS event of "congestion" type is generated. When the exchange to which the calling terminal is connected receives such a "congestion" EOS event, it processes it by its EOS processing function, which recognizes the "congestion" EOS event and then establishes to send a congestion tone to the calling terminal and to release the connection. Typically, for each type of EOS event, the EOS processing function of an exchange counts the number of received EOS events of that type by means of a respective counter.

The number of unsuccessful call setup procedures in a telephone network affects the quality of service of telephone services provided by a network provider through the telephone network. In particular, a network provider would have to minimize the ratio between the number of unsuccessful call setup procedures and the overall number of call requests.

Different methods are known in the art for monitoring the performance, or quality of service, of a telephone network.

U.S. Pat. No. 6,914,967 describes a method for assessing the quality of service of telephone calls on a trunk by identifying and counting telephone call sequences including a plurality of telephone calls placed on the trunk by analyzing CDRs. Each of the telephone calls in the sequence has the same originating telephone number and the same destination telephone number and a start time and a stop time and an elapsed time between the stop time of a telephone call and the start time of the next telephone call in a sequence being less than a predetermined amount. Identifying and counting unanswered reattempted telephone calls or answered reattempted telephone calls. A ratio is calculated between the number of identified unanswered or answered reattempted telephone calls to the number of identified telephone call sequences, such that the ratio provides a measure of the quality of service of telephone calls on the trunk.

WO 0120920 discloses a method for monitoring service quality using Call Detail Records (CDR) in a communications network, such as an SS7 network. Network monitors capture substantially all signaling units in the SS7 network and generate a complete record for all calls, transactions and other communications over the network. Users configure CDR profiles that are used to filter the records. A CDR application filters the records by parsing out signaling unit components that have been selected by the user in the CDR profile. The selected message components are then formatted into a CDR record, which is sent to an external system that generates certain statistics for the message records and stores the statistics to a database. A report application recalls the statistics from the database and presents statistics in a reporting format configured by the user. The reports indicate the statistical performance of network providers for selected called or calling telephone numbers or for selected services. The CDRs and statistics are available to a user either in real-time or in response to a query of historical CDR data.

U.S. Pat. No. 6,381,306 describes a method for generating service quality statistics for a communications network. Network monitors capture messages in a communications network, such as an SS7 network, and correlate related messages into records. The records are filtered using a call detail record profile to create call detail records which are provided to a statistics server. The statistics server generates certain statistics for the message records and stores the statistics to a database. A report application recalls the statistics from the database and presents statistics in a reporting format configured by the user. The reports indicate the statistical performance of network providers for selected called or calling telephone numbers or for selected services.

U.S. Pat. No. 6,529,594 discloses a method for capturing signaling units at international gateways in a communications network. The signaling units are processed to determine the source and destination networks for the associated calls. The country code, nature of address field, destination point code and origination point code is used to process each message. Data about the messages that pass through the international gateway is stored to a memory device. The data can be recalled for each originating or destination network in the form of performance or quality of service statistics.

OBJECT AND SUMMARY OF THE INVENTION

As to U.S. Pat. No. 6,914,967, the Applicant has noticed that this known method exhibits some drawbacks. Firstly, exchange generated Call Detail Records do not contain all the EOS events, since they are mainly employed for charging purposes, and so they are usually generated upon successful connections. In other words, Call Detail Records mainly contain information about "normal" EOS events. Therefore, Call Detail Records do not allow to collect enough information about EOS events other than "normal", i.e. EOS events relating to unsuccessful connections. This disadvantageously does not allow to perform a complete analysis of unsuccessful connections, and therefore it prevents the provider from performing an accurate diagnosis of possible faults, congestions or other problems of its telephone network.

As for the other documents cited above, the Applicant has noticed that also these known methods exhibit some drawbacks, in that these methods disadvantageously require the installation of dedicated probes in already existent telephone networks, for detecting signaling messages. Such installation would be time consuming, costly, and complex.

Therefore, the general object of the present invention is providing a method of monitoring the performance of a telephone network which overcomes the aforesaid problems.

More particularly, an object of the present invention is providing a method of monitoring performance of a telephone network by monitoring outcomes of call setup procedures, which profitably allows to collect information relating to unsuccessful call setup procedures, and to analyze such information in order to diagnose failures, congestions and other problems of the telephone network. Profitably, the method can be implemented with reduced modifications of existing exchanges and their processing resources and memory resources, and without requiring installation of dedicates apparatuses in the telephone network.

According to a first aspect, the present invention provides a method of monitoring performance of a telephone network. The telephone network comprises at least one exchange configured for collecting signaling messages, which are received at the at least one exchange and/or which are generated at the at least one exchange. The method comprises: acquiring from the exchange a set of signaling messages indicating unsuccessful call setup procedures relative to calls addressed to a plurality of destinations (step a); associating to each signaling message of the set of signaling messages a respective destination information which is indicative of the destination of the unsuccessful call which generated the signaling message (step b); and processing the set of signaling messages and the corresponding associated destination information, thus obtaining information relative to the unsuccessful call setup procedures according to call destinations (step c).

Preferably, the step of processing comprises counting, for each destination of the plurality of destinations, a respective number of signaling messages, thus obtaining, for each destination, a respective number of signaling messages indicating unsuccessful call setup procedures relative to calls addressed to said each destination.

Preferably, the destination information comprises one or more most significant digits of a callee telephone number. In this case, profitably, the method further comprises acquiring configuration information from the at least one exchange, wherein the configuration information comprise said one or more most significant digits.

Optionally, the configuration information further comprise information about processing and/or memory resources allocated in said at least one exchange, and/or priority information of said signaling messages.

Preferably, steps a), step b) and step c) are periodically performed with a predetermined period. In this case, preferably, the method further comprises, during a first period, changing the configuration information into modified configuration information, based on the information relative to the unsuccessful call setup procedures according to call destinations, and transmitting the modified configuration information to the at least one exchange. Then, preferably, during a second period subsequent to said first period, the method further comprises marking as not reliable the information relative to the unsuccessful call setup procedures obtained during the first period.

Profitably, changing the configuration information into modified configuration information comprises changing the number of callee telephone number most significant digits. More particularly, changing the number of callee telephone number most significant digits comprises either increasing or decreasing the number of callee telephone number most significant digits.

Optionally, changing the configuration information comprises changing the allocation of at least part of the processing and/or memory resources in the at least one exchange.

Profitably, the signaling messages comprise end of selection signals, wherein an end of selection signal indicates an end of a call setup procedure.

According to a second aspect, the present invention provides a device for monitoring performance of a telephone network. The telephone network comprises at least one exchange configured for collecting signaling messages which are received at the at least one exchange and/or which are generated at the at least one exchange. The device comprises: a first receiver for acquiring from the exchange a set of signaling messages indicating unsuccessful call setup procedures relative to calls addressed to a plurality of destinations; a first function for associating to each signaling message of the set of signaling messages a respective destination information which is indicative of the destination of the unsuccessful call which generated the signaling message; and a second function for processing the set of signaling messages and the corresponding associated destination information, thus obtaining information relative to the unsuccessful call setup procedures according to call destinations.

Preferably, the second function is configured for counting, for each destination of the plurality of destinations, a respective number of signaling messages, thus obtaining, for each destination, a respective number of signaling messages indicating unsuccessful call setup procedures relative to calls addressed to each destination.

Preferably, the destination information comprises one or more most significant digits of a callee telephone number.

Optionally, the device comprises a second receiver which is configured for acquiring configuration information from said at the one exchange, wherein the configuration information comprise the one or more most significant digits and/or information about processing and/or memory resources allocated in the at least one exchange, and/or priority information of the signaling messages.

Profitably, the first receiver, the first function and the second function are configured for operating according to a predetermined period. In this case, preferably, when the first receiver, the first function and the second function are configured for operating according to a predetermined period, the device is configured for providing, during a first period, modified configuration information based on the information relative to the unsuccessful call setup procedures according to call destinations, and for transmitting the modified configuration information to the at least one exchange. Further, preferably, the device is further configured for, during a second period subsequent to the first period, marking as not reliable the information relative to the unsuccessful call setup procedures obtained during the first period.

Profitably, the device is configured for changing the configuration information, in particular by changing the number of callee telephone number most significant digits. Further, preferably, the device is configured for changing the allocation of at least part of the processing and/or memory resources in the at least one exchange.

Preferably, the signaling messages comprise end of selection signals, wherein an end of selection signal indicates an end of a call setup procedure.

In a third aspect, the present invention provides a telephone network comprising at least an exchange and a device as set forth above.

In a fourth aspect, the present invention provides a computer program product, loadable in the memory of at least one computer and including software code portions for performing the method as set forth above.

BRIEF DESCRIPTION OF THE DRAWINGS

The present invention will become more clear in view of the following description, given by way of example and not of limitation, to be read with reference to the accompanying drawings, wherein.

DETAILED DESCRIPTION OF PREFERRED EMBODIMENTS OF THE INVENTION

Figure 1:
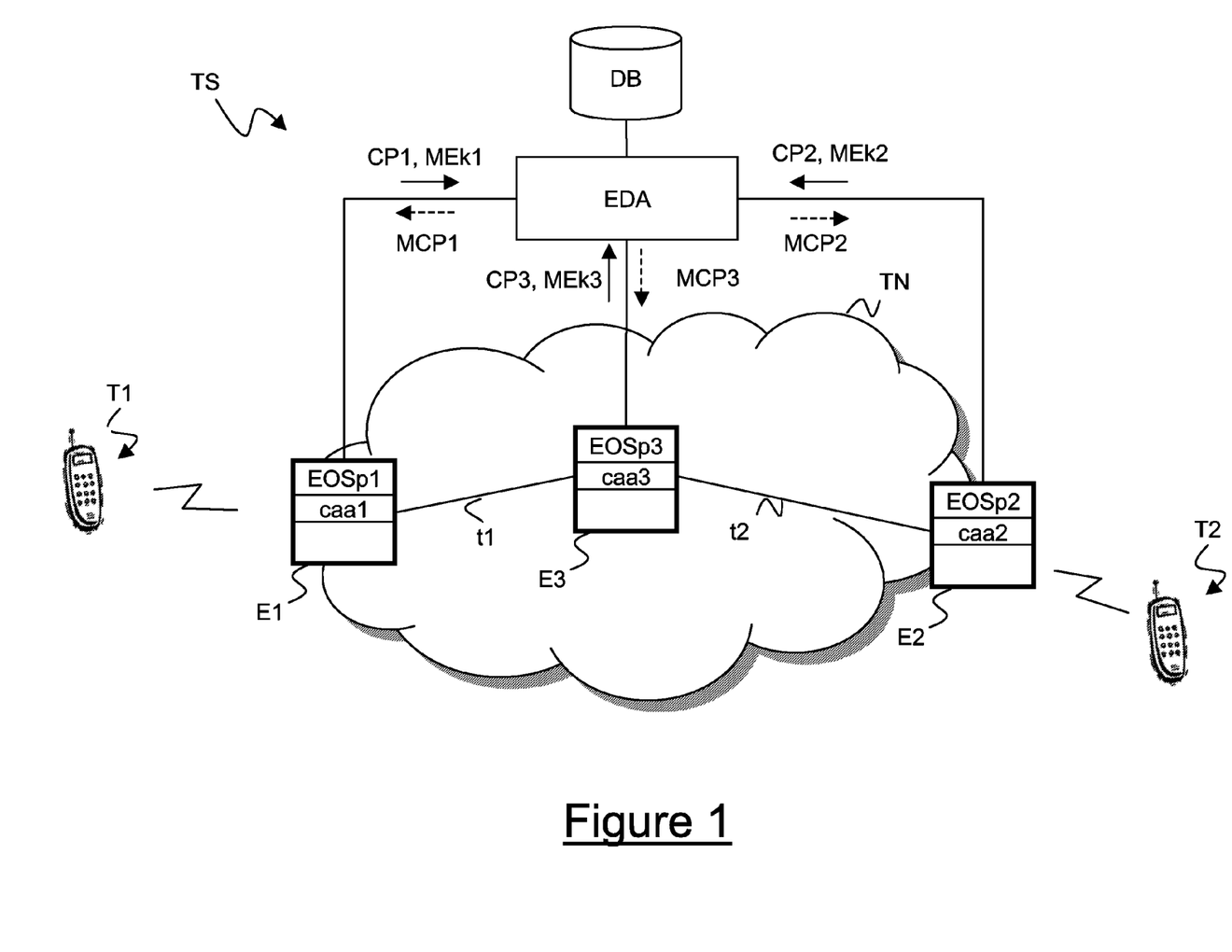
FIG. 1 schematically shows a telephone system which is adapted to implement the method according to an embodiment of the present invention.

FIG. 1 schematically shows a telephone system TS which is adapted to implement the method for monitoring performance in a telephone network, according to an embodiment of the present invention.

The telephone system TS of FIG. 1 comprises a telephone network TN and an EOS dynamic analysis server EDA.

The telephone network TN of FIG. 1 comprises a mobile telephone network. Nevertheless, in other embodiments not shown in the drawings, the telephone network may also comprise a fixed circuit-switched network such as a PSTN network and/or a packet-switched transport network wherein the signaling protocol provides EOS signals, such as the UMTS network. The telephone network TN comprises a plurality of exchanges interconnected by trunks. For simplicity, FIG. 1 only shows three exchanges E1, E2, E3 and two trunks t1, t2, wherein the trunk t1 interconnects the exchanges E1 and E2, while the trunk t2 interconnects the exchanges E2 and E3.

As already mentioned, a plurality of terminals may be connected to each exchange E1, E2, E3. For simplicity, FIG. 1 only shows a terminal T1 connected to the exchange E1 and a terminal T2 connected to the exchange E2. Terminals connected to the exchange E3, if any, are not shown in FIG. 1.

Each exchange E1, E2, E3 has a respective EOS processing function EOSp1, EOSp2, EOSp3. Each EOS processing function EOSp1, EOSp2, EOSp3 is adapted to process received EOS events of a given type of a predefined set of EOS event types. The set of predefined EOS event types is established by each network provider. In particular, the EOS processing function associates a respective counter to each type of EOS event of the predefined set. Each time an EOS event of a given type is received, the EOS processing function is adapted to increase the respective associated counter.

Besides, each exchange E1, E2, E3 comprises a respective callee number analysis function caa1, caa2, caa3, whose main task is, for each request for a call to a given callee number received by the exchange E1, E2, E3, respectively, analyzing the most significant digits of the callee number for routing purposes, in order to setup the call. Each exchange E1, E2, E3 further comprises other functions, such as routing functions or the like, which will not be described, since they are not relevant to the present description.

The server EDA is connected to the exchanges E1, E2, E3 of the telephone network TN. Each link between the server EDA and the exchanges E1, E2, E3 is bi-directional, i.e. the server EDA is able both to distribute information to and collect information from each exchange E1, E2, E3. The server EDA is further preferably connected to a database DB, which is adapted to store information collected by the server EDA from the exchanges E1, E2, E3. The database could be provided in the server EDA. Further, the server EDA comprises a first receiver (which is not shown in FIG. 1 for simplicity) for receiving measurement data from exchanges, as it will be explained in further detail herein after. Further, the server EDA comprises a second receiver (which is not shown in FIG. 1 for simplicity) for receiving configuration parameters from exchanges, as it will be explained in further detail herein after.

In particular, according to the present invention, each exchange associates to each type of EOS event a respective overall counter, which is incremented each time an EOS event of the corresponding type is received at the exchange. Besides, each exchange associates to each type of EOS event a plurality of per-destination counters, each per-destination counter being associated to a different combination of n most significant digits of the callee number. Upon reception of an EOS event associated to a call addressed to a given callee number, the exchange increases the overall counter, it analyses the callee number through its callee number analysis function, and then it increases the per-destination counter associated to the combination of n digits representing the n most significant digits of the callee number.

The number n is preferably adjusted according to different parameters, such as the resources available at the exchanges, the desired detail level about destination of requested call, and the like.

Then, the server EDA collects measurement data from each exchange of the telephone network. Measurement data are preferably periodically collected with a predetermined measurement period, at predetermined measurement times.

Measurement information collected by the server preferably comprise, for each different type of EOS event, the values reached by the overall counter and by the different per-destination counters during a measurement period. The overall counter and the per-destination counters are preferably reset at the beginning of each measurement period.

Therefore, advantageously, according to the present invention, each exchange is able to provide measurement data relative to received EOS event which contains detail not only about the type of EOS event, but also about the destination of the call inducing the EOS event, thus allowing the server to perform a per-destination analysis of EOS events. This advantageously allows to locate possible fault/congestions of the telephone network.

Moreover, advantageously, according to embodiments of the present invention, measurement data are collected from all the exchanges of the network. This advantageously allows to collect information about EOS events received by all the exchanges of the telephone network, included the intermediate exchanges of each attempted connection. This advantageously allows to locate in a more precise way possible congestions and/or faults of the telephone network.

Moreover, advantageously, the method of the invention can be implemented substantially without modifying known exchanges, since the method employs already existing functions of known exchanges, in particular the EOS processing function and the callee number analysis function. Indeed, the present invention can be implemented by providing a server for adjusting configuration parameters of such already existing functions. Therefore, implementing the method according to the present invention is particularly simple and inexpensive.

Figure 2:
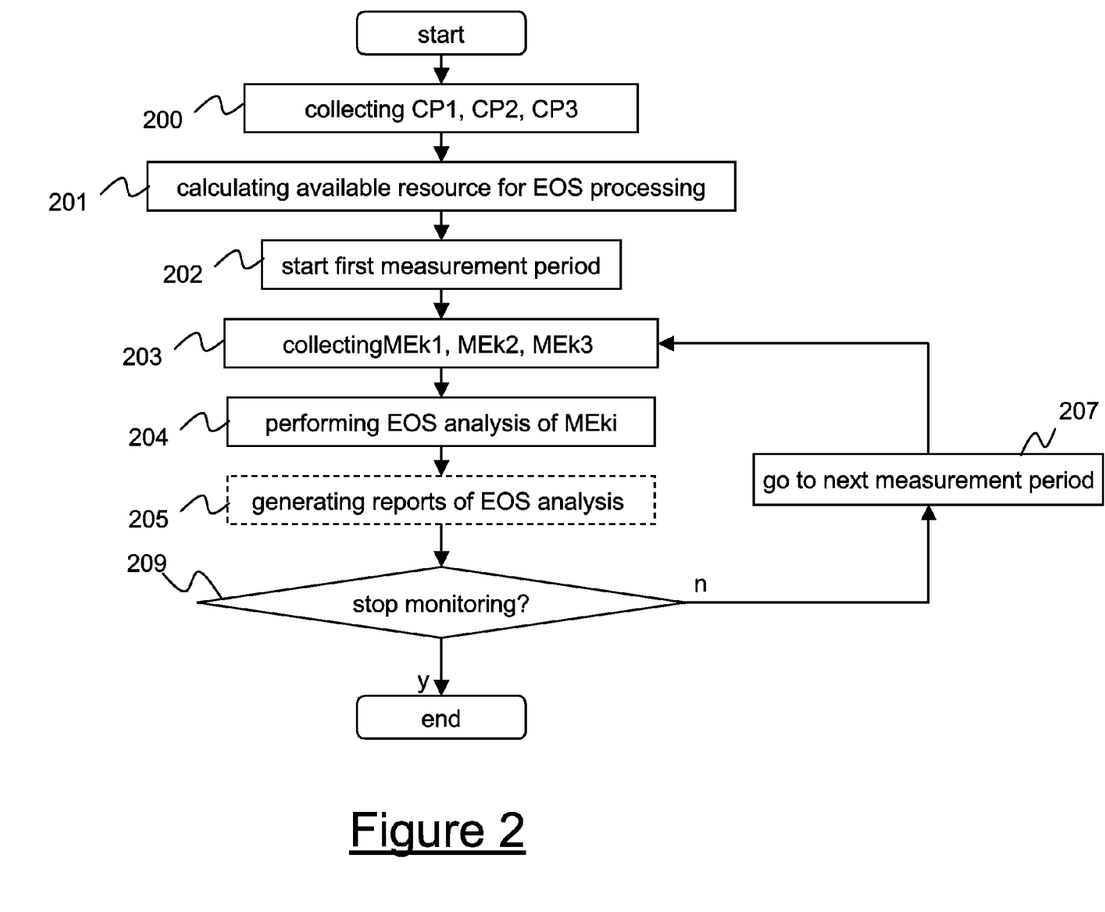
FIG. 2 schematically shows an exemplary flow chart of the operation of the EOS dynamic analysis server of FIG. 1, according to a first embodiment of the present invention.

In the following, by referring to FIG. 2, schematically showing an exemplary flow diagram of the operation of the server EDA of FIG. 1, an embodiment of the method according to the present invention will be explained in further detail.

Firstly, the server EDA collects from each exchange E1, E2, E3 configuration parameters CP1, CP2, CP3 relating to the respective EOS processing function EOSp1, EOSp2, EOSp3 and callee number analysis function caa1, caa2, caa3 of each exchange (step 200). Such configuration parameters CP1, CP2, CP3 are preferably stored into the database DB. In particular, configuration parameters CP1, CP2, CP3 collected from each exchange E1, E2, E3 during step 200 comprise at least one of the following parameters:

- list of interesting EOS events. This parameter allows to select, among different types of EOS events received by an exchange, the EOS events to be analyzed (for instance, measurement data relative to "normal" EOS events and "busy" EOS events will preferably not be analyzed);
- number n of most significant digits of the callee number to be analyzed for each type of EOS event. The number n is preferably set equal to its minimum value nmin, and afterwards it will be dynamically increased, if necessary, as it will be described herein after;
- maximum amount of resources to be allocated for generating measurement data relative to each type of EOS event. This parameter allows to avoid that, in case of a failure and/or congestion in the telephone network causing an exchange to receive a huge amount of EOS events, the exchange processes all the received EOS events, thus subtracting a significant amount of resources to user traffic management; and
- priority of each interesting EOS event type. This parameter advantageously allows to sort different types of interesting EOS events so that, in case the maximum amount of resource to be allocated for generating measurement data is not sufficient to detail all the received EOS events, each exchange generates measurement data with the required detail level only for EOS event types with higher priority, thus reducing the detail level of measurement data relative to EOS events types with lower priority.

According to configuration parameter CP1, CP2, CP3 collected by the server EDA, the server EDA establishes for each exchange E1, E2, E3 the maximum amount of exchange resources to be allocated for processing received EOS events and for generating measurement data MEk1, MEk2, MEk3 relative to such events (step 201).

As shown in FIG. 2, the steps following step 201 are periodically performed, i.e. they are performed in predetermined measurement times spaced by a given measurement period. Preferably, the measurement period is comprised between about 15 and about 60 minutes.

In the example of FIG. 2, steps 200 and 201 are not performed periodically. However, according to embodiments of the present invention which are not shown into the drawings, also steps 200 and 201 may be periodically performed.

At the beginning of a given measurement period (in FIG. 2, step 202 indicates the beginning of the first measurement period), the server EDA collects from each exchange E1, E2, E3 measurement data MEk1, MEk2, MEk3 (step 203), which each exchange E1, E2, E3 has generated during the previous measurement period. During step 203, the server EDA stores the collected measurement data MEk1, MEk2, MEk3 into the database DB according to the above cited data model which will be described in further detail by referring to FIG. 3. Measurement data collected from each exchange substantially comprise, for each EOS event type received by the exchange, the value of the overall counter and of the per-destination counters at the end of the previous measurement period.

Then, the server EDA analyses measurement data MEk1, MEk2, MEk3 (step 204), as it will be explained in further detail herein after by referring to FIG. 5.

Then, the server EDA may optionally generate an analysis report comprising results of the analysis performed at step 204 (step 205). During step 205, the server EDA may also visualize such an analysis report, for instance by means of a graphic interface. In this way, an operator may visualize the analysis results at each cycle, so that he can periodically check outcomes of call setup procedures in the telephone network.

Then, the server EDA waits until the next measurement time (step 207), and then repeats steps 203 to 205, i.e.: at step 203, measurement data are collected and stored in the database DB, at step 204 measurement data are analyzed and at step 205 an analysis report is optionally generated and displayed.

Steps 203 to 205 are periodically repeated at each measurement period, until the operator decides to stop monitoring performance, for instance by providing a stop command by the above cited user interface of the server EDA (step 209).

According to particularly preferred embodiments of the present invention, after collecting the measurement data, the server EDA analyzes them and decides whether to modify the configuration parameters of each exchange. In particular, according to the analysis of the measurement data relating to a given EOS event type received by a given exchange, the server EDA may decide to modify configuration parameters of the callee number analysis function of the given exchange in order to increase or decrease the number n of most significant digits of callee numbers to be analyzed relating to EOS events of the given type.

Therefore, in case the number of EOS events of a given type, associated to a given combination of n digits and received by an exchange during a measuring period exceeds a predetermined threshold, the server EDA may modify configuration parameters of the exchange so that the exchange inserts into the measurement data more detailed additional information relating to this type of EOS event, for instance by increasing the number n of most significant digits of callee numbers to n+m, m being equal to or higher than one.

Similarly, in case the number of EOS events of a given type, associated to a given combination of n digits and received by an exchange during a measuring period decreases under a predetermined threshold, the server EDA may modify configuration parameters of the exchange so that the exchange inserts into the measurement data less detailed additional information relative to this type of EOS event, for instance by decreasing the number n of most significant digits of callee numbers to n−k, k being equal to or higher than one.

Therefore, according to such embodiments of the present invention, before starting collecting measurement data, n may be set equal to a minimum value, nmin, which could be for instance zero, for each exchange of the network and for each EOS event type (for nmin=0, no per-destination counters are generated). Therefore, at the beginning, when n is equal to its minimum value nmin, the amount of resource each exchange allocates for generating and storing measurement data is minimum. In particular, in case nmin=0, the exchanges do not allocate any resource for executing their callee number analysis function.

Then, in case the number of EOS events of a given type received by an exchange exceeds the above threshold during a successive measurement period, according to such advantageous embodiments, n is increased from its minimum value nmin to a value nmin+m, so that measurement data provided by the exchange are more detailed, i.e. they provide more details about destination of call requests resulting in EOS events of the given type. Such more detailed measurement data advantageously allow to localize more accurately possible problems such as congestions or failures in the telephone network, and then to perform actions upon the network for recovering the required performance.

Therefore, advantageously, resources of each exchange can be managed in a more efficient way, since the amount of resources each exchange allocates for generating measurement data (and, more particularly, per-destination counters) is dynamically adapted to the detail level required for such measurement data. So, in case not very detailed per-destination information are required, each exchange allocates few resources for generating measurement data, thus preserving the greatest part of its resources for other purposes, such as managing user traffic.

Figure 3:
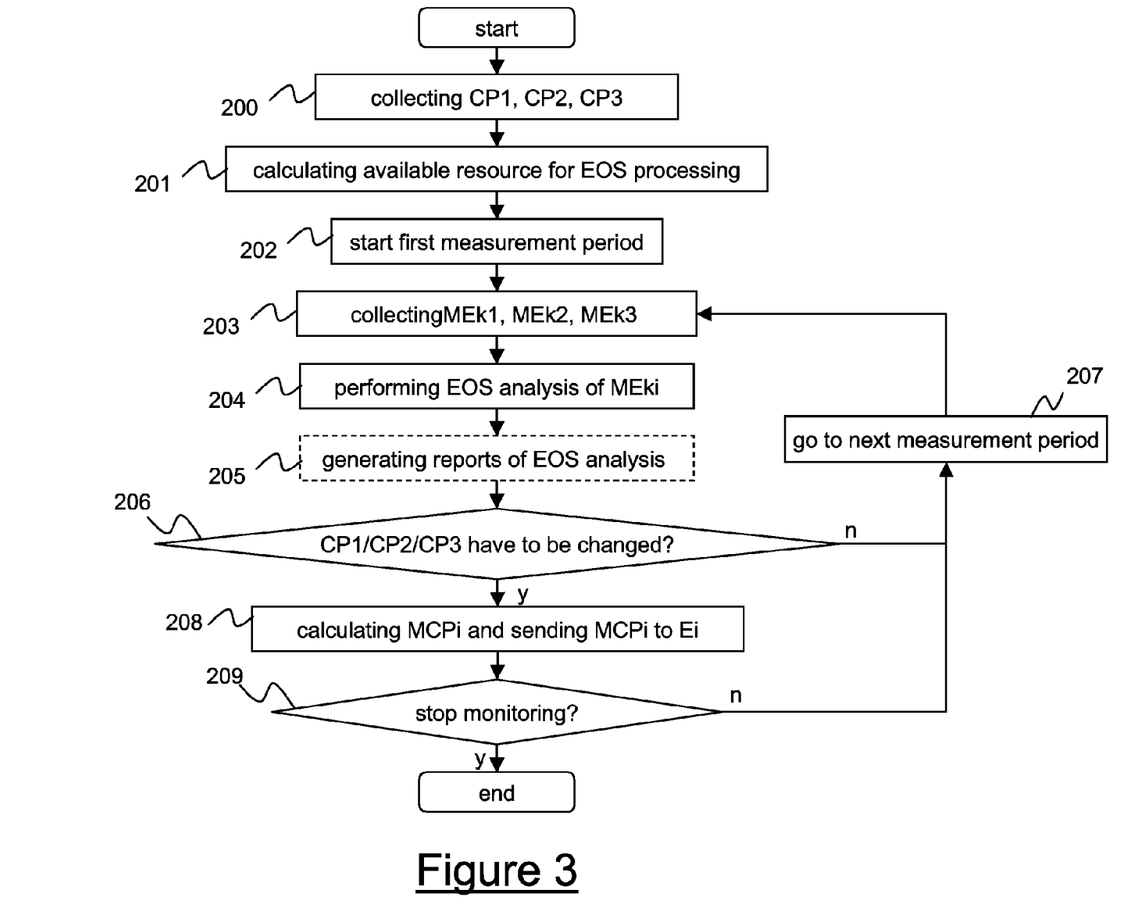
FIG. 3 schematically shows an exemplary flow chart of the operation of the EOS dynamic analysis server of FIG. 1, according to a second embodiment of the present invention.

In the following, by referring to FIG. 3, schematically showing an exemplary flow diagram of the operation of the server EDA of FIG. 1, an example of such particularly preferred embodiments of the method of the invention will be explained in further detail.

Since steps 201-205 are the same of the flow chart of FIG. 2, their description will be repeated only in short form.

After performing step 200 (collecting configuration parameters) and step 201 (calculating available resources for each exchange), the server DESA starts measuring. The start of the first measuring period is still indicated as step 202. During a given measurement period, the server DESA performs steps 203 (collecting measurement data), 204 (performing analysis of measurement data) and 205 (generating report of analysis results).

Then, according to results of the analysis performed at step 204, the server EDA determines, for each EOS event type and for each exchange E1, E2, E3, whether configuration parameters CP1, CP2, CP3 have to be changed. In particular, for each EOS event type and for each exchange E1, E2, E3, the server EDA determines whether per-destination details comprised into measurement data has to be changed, for instance by modifying the number n of most significant digits of the callee number associated to the EOS event (step 206).

In case configuration parameters CP1, CP2, CP3 are not to be changed, the server EDA waits until the next measurement time (step 207). Therefore, steps 203 to 205 are repeated.

In case configuration parameters of at least one exchange (for instance E1) have to be changed, the server EDA calculates the new configuration parameters MCP1, and it sends them to the exchange E1 (step 208). Step 206 will be described herein after in further detail by referring to FIG. 7. During step 208, the server EDA further modifies the data model comprised into the database DB and adapted to store measurement data which will be collected at the next measurement period, as it will be shown herein after. Then, the server EDA waits until the next measurement time (step 207), and then repeats steps 203 to 205.

Steps 203 to 208 are periodically repeated at each measurement period, until the operator decides to stop monitoring performance, for instance by providing a stop command by the above cited user interface of the server EDA (step 209).

Figure 4:
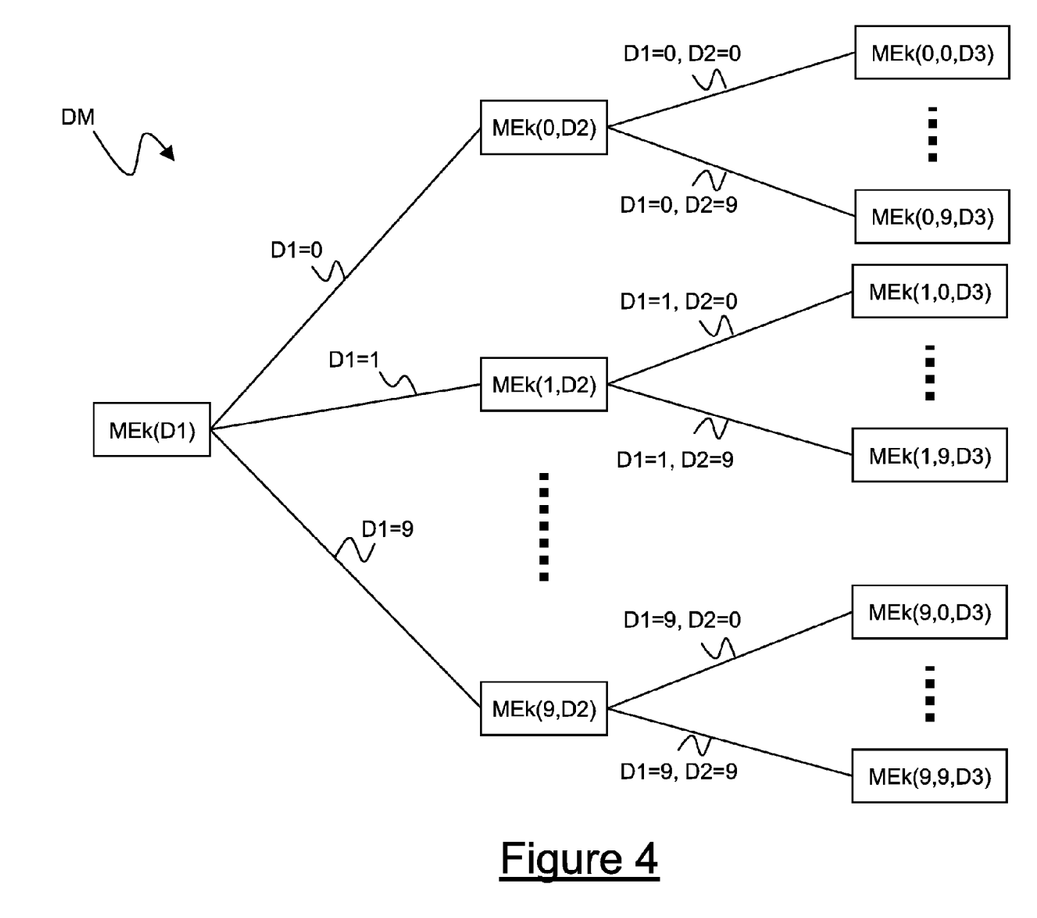
FIG. 4 schematically shows a data model for implementing the method of the invention.

FIG. 4 schematically shows a data model DM comprised into the database DB for storing measurement data collected by the server EDA during each step 203.

The data model DM of FIG. 4 has a tree structure. Nevertheless, this is not limiting, since according to embodiments of the present invention not shown in the drawings, the data model may also have other structure, such as a table.

In particular, the data model DM of FIG. 4 is adapted to store measurement data relative to a single type of EOS events received by a given exchange (for instance, "network congestion" EOS events). Therefore, the database DB preferably comprises a separate data model DM for each different type of EOS event to be measured. Further, in FIG. 4 it is assumed that n=3. Therefore, measurement data relative to "network congestion" EOS events comprise the three most significant digits D1, D2, D3 of the callee number in the additional information. It has to be noticed that the number may be different for each different type of EOS events.

In FIG. 4, the root MEk(D1) of the data model DM stores the value of the overall counter associated to "network congestion" EOS events associated to callee numbers whose most significant digit D1 ranges from 0 to 9, i.e. all the "network congestion" EOS events received by the exchange. Therefore, measurement data comprised into the root do not provide any detail about destination of call requests resulting in "network congestion" EOS events, so that only the overall number of received "network congestion" EOS events can be determined.

Ten branches D1=0, D1=1, ..., D1=9 radiate from the root MEk(D1), each branch D1=0, D1=1, ..., D1=9 corresponding to a different value 0, 1, ... 9 of the most significant digit D1. Each branch D1=0, D1=1, ..., D1=9 leads to a respective node MEk(0, D2), MEk(1, D2), ..., MEk(9, D2). In particular, the node MEk(0, D2) of the data model DM stores the value of the per-destination counter associated to "network congestion" EOS events associated to callee numbers whose most significant digit D1 equals 0, while the second most significant digit D2 ranges from 0 to 9, i.e. all the "network congestion" EOS events received by the exchange relative to call requests towards callee numbers whose first digit is 0. Similarly, the node MEk(1, D2) of the data model DM stores the value of the per-destination counter associated to "network congestion" EOS events associated to callee numbers whose most significant digit D1 equals 1, while the second most significant digit D2 ranges from 0 to 9, i.e. all the "network congestion" EOS events received by the exchange relative to call requests towards callee numbers whose first digit is 1. And so on, until the node MEk(9, D2) of the data model DM, which stores the value of the per-destination counter associated to "network congestion" EOS events associated to callee numbers whose most significant digit D1 equals 9, while the second most significant digit D2 ranges from 0 to 9, i.e. all the "network congestion" EOS events received by the exchange relative to call requests towards callee numbers whose first digit is 9.

Therefore, measurement data comprised into nodes MEk (0, D2), MEk(1, D2), ..., MEk(9, D2) provide a first detail level about destination of call requests resulting in "network congestion" EOS events. Therefore, is it possible to determine a different number of "network congestion" EOS events received by an exchange for each different value of the most significant digit D1. Therefore, for instance, in case of a congestion of a trunk supporting connections towards a given destination, the number of "network congestion" EOS events received by the exchange for a value of D1 indicating such a destination will be particularly high, thus allowing to perform a first detection of the congestion location.

Ten branches (from (D1=0,D2=0) to (D1=0,D2=9); from (D1=1,D2=0) to (D1=0,D2=9); ... and from (D1=9,D2=0) to (D1=9,D2=9)) radiates from each node MEk(0, D2), MEk(1, D2), ..., MEk(9, D2), respectively, each branch corresponding to a different value 0, 1, ... 9 of the second most significant digit D2. Each branch (D1=0,D2=0) to (D1=0,D2=9) leads to a respective node MEk(0, 0, D3), ..., MEk(0, 9, D3). Similarly, each branch (D1=1,D2=0), ..., (D1=1,D2=9) leads to a respective node MEk(1, 0, D3) to MEk(1, 9, D3). Similarly, each branch (D1=9,D2=0) to (D1=9,D2=9) leads to a respective node MEk(9, 0, D3) to MEk(9, 9, D3).

In particular, the node MEk(0, 0, D3) of the data model DM stores the value of the per-destination counter associated to "network congestion" EOS events associated to callee numbers whose most significant digit D1 equals 0, whose second most significant digit D2 equals 0, while the third most significant digit D3 ranges from 0 to 9, i.e. all the "network congestion" EOS events received by the exchange relative to call requests towards callee numbers whose first digits are "00". Similarly, the node MEk(0, 9, D3) of the data model DM stores the value of the per-destination counter associated to "network congestion" EOS events associated to callee numbers whose most significant digit D1 equals 0, whose second most significant digit D2 equals 9, while the third most significant digit D3 ranges from 0 to 9, i.e. all the "network congestion" EOS events received by the exchange relative to call requests towards callee numbers whose first digits are "09". And so on, until the node MEk(9, 9, D3) of the data model DM, storing the value of the per-destination counter associated to "network congestion" EOS events associated to callee numbers whose most significant digit D1 equals 9, whose second most significant digit D2 equals 9, while the third most significant digit D3 ranges from 0 to 9, i.e. all the "network congestion" EOS events received by the exchange relative to call requests towards callee numbers whose first digits are "99".

Therefore, measurement data comprised into nodes MEk (0, 0, D3), ..., MEk(9, 9, D3) provide a higher detail level about destination of call requests resulting in "network congestion" EOS events. Therefore, it is possible to determine a different number of "network congestion" EOS events received by an exchange for each different combination of the two most significant digits D1, D2. Therefore, location of the congestion/failure becomes more accurate.

By increasing n, destination of call requests resulting in "network congestion" EOS events is more accurately identified, so that failures/congestions causing such unsuccessful connection associated to such "network congestion" EOS events can be located in a more accurate way. However, by increasing n, the number of resources to be allocated for measuring "network congestion" EOS events increases. Therefore, by increasing n, location of failures becomes more accurate, but also more expensive from the resource allocation point of view. In particular, the total number N of nodes of the data model depends on n according to the following equation:

$$N = \sum_{i=1}^{n} 10^{i-1}.$$

Therefore:
for n=1, N=1;
for n=2, N=1+10=11;
for n=3, N=1+10+100=111;
for n=4, N=1+10+100+1000=1111.

Therefore, increasing n results in exponential increase of N. Therefore, by increasing N, both the amount of resources the exchange has to allocate for generating measurement data relative to "network congestion" EOS events and the amount of memory the database DB has to allocate for storing the data model relative to "network congestion" EOS events is exponentially increased. Therefore, preferably, the number n for each type of EOS events is kept as low as possible. In the embodiment shown in FIG. 4, n can be dynamically increased only if necessary (i.e. only if the server EDA determines that the number of EOS events of a given type received by the exchange in a measurement period has exceeded a predefined threshold).

Preferably, in the embodiment of FIG. 3, wherein configuration parameters can be dynamically changed according to the results of the EOS analysis, when configuration parameters relative to the EOS processing function of a given EOS event type are modified during a certain measurement period, measurement data collected in the next measurement period are not taken into account. Then preferably, the server EDA marks such measurement data with a "not reliable" flag, as in will be explained in further detail herein after by referring to FIG. 5.

Figure 5:
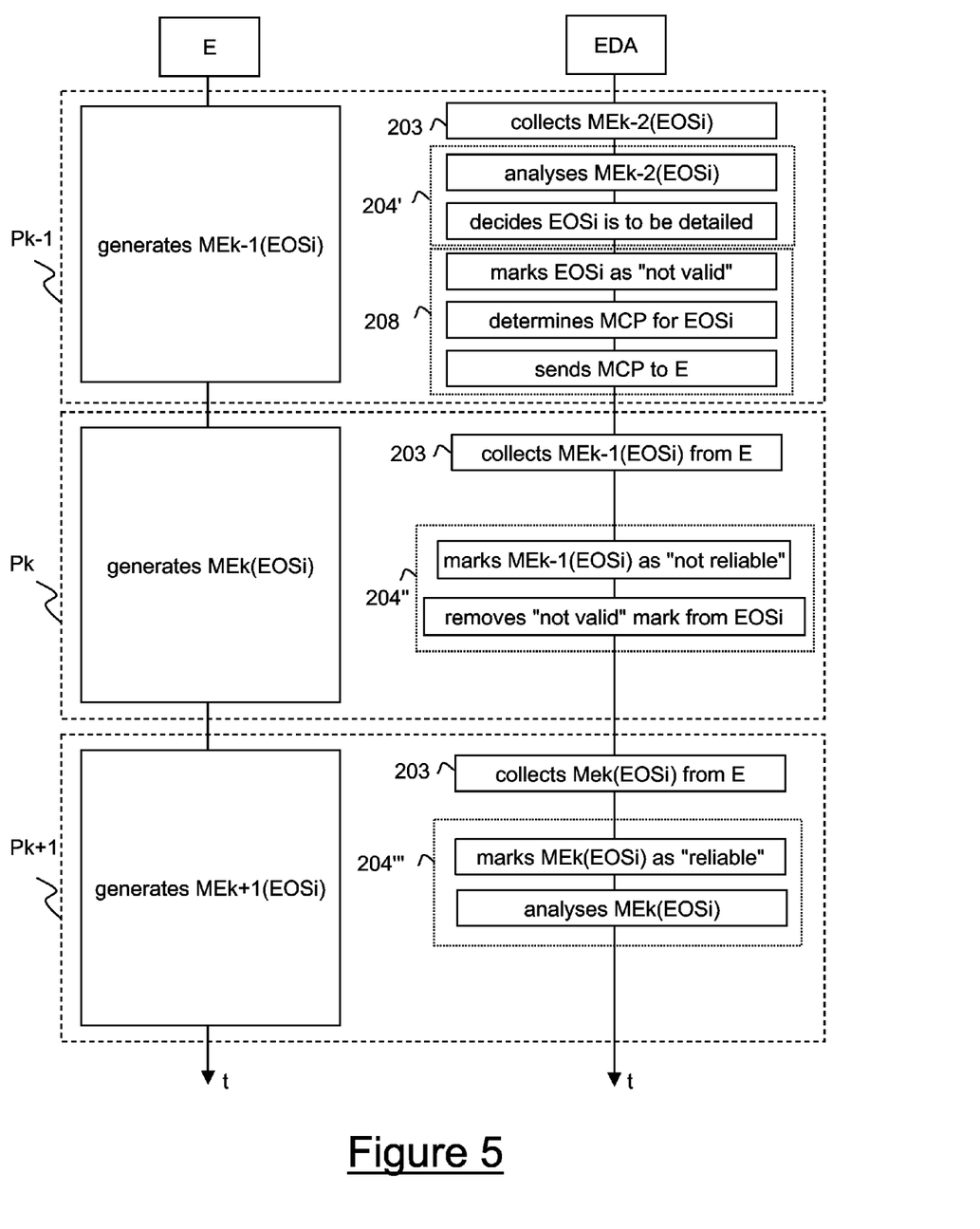
FIG. 5 schematically shows a time diagram for assigning a "non reliable" flag collected measurement data.

FIG. 5 schematically shows a time diagram for assigning a "non reliable" flag to collected measurement data, according to an embodiment of the present invention.

FIG. 5 schematically shows three consecutive measurement periods Pk−1, Pk and Pk+1. It is assumed that measurement data collected during each measurement period Pk−1, Pk and Pk+1 only relates to a single type of EOS events, for instance to "network congestion" EOS events.

In FIG. 5, E indicates a generic exchange of the telephone network TN, which could be any of exchanges E1, E2, E3. It is also assumed that k≧2, i.e. Pk−1 is at least the second measuring period after the beginning of the method, i.e. measurement data MEk−2(EOSi) have been generated by the exchange during the measurement period preceding Pk−1 (not shown in FIG. 5).

During the first period Pk−1, the exchange E generates measurement data MEk−1(EOSi) relative to EOS event type EOSi, i.e. "network congestion" EOS events received during the first measurement period Pk−1. On the other hand, during the measuring period Pk−1, the server EDA collects from the exchange E measurement data MEk−2(EOSi) generated during the measurement period preceding Pk−1. Then, the server EDA analyses the measurement data MEk−2(EOSi), and according to this analysis determines that measurement data relative to EOS event type EOSi have to be further detailed. Therefore, the server EDA marks the EOS event type as "not valid", so that measurement data which will be collected in the next measurement period will be not taken into account. Then, the server EDA determines the new configuration parameters MCP relative to EOS event type EOSi, for instance by increasing n. Then, during Pk−1, the server EDA sends these new configuration parameters MCP to the exchange E.

During the next measurement period Pk, the exchange E generates measurement data MEk(EOSi). Further, during the measurement period Pk, the server EDA collects from the exchange E measurement data MEk−1(EOSi) generated during the measurement period Pk−1. Since new configuration parameters has been received and applied by the exchange E at the end of the preceding period Pk−1, measurement data MEk−1(EOSi) generated during the period Pk−1 are not detailed according to the new configuration parameters MCP. Therefore, according to embodiments of the present invention, the server EDA marks such measurement data MEk−1(EOSi) with a "not reliable" flag, since they are not enough detailed. At the end of the period Pk, preferably, the server EDA removes the flag "not valid" from the EOS event type EOSi.

During the next measurement period Pk+1, the exchange E generates measurement data MEk+1(EOSi). Further, during the measurement period Pk+1, the server EDA collects from the exchange E measurement data MEk (EOSi) generated during the measurement period Pk. Measurement data MEk (EOSi) have been generated after the exchange E has received and updated configuration parameters. Therefore, such measurement data MEk (EOSi) are detailed enough. Therefore, according to embodiments of the present invention, the server EDA marks such measurement data MEk−1(EOSi) with a "reliable" flag. Therefore, such measurement data with "reliable" flag will be analyzed.

Figure 6:
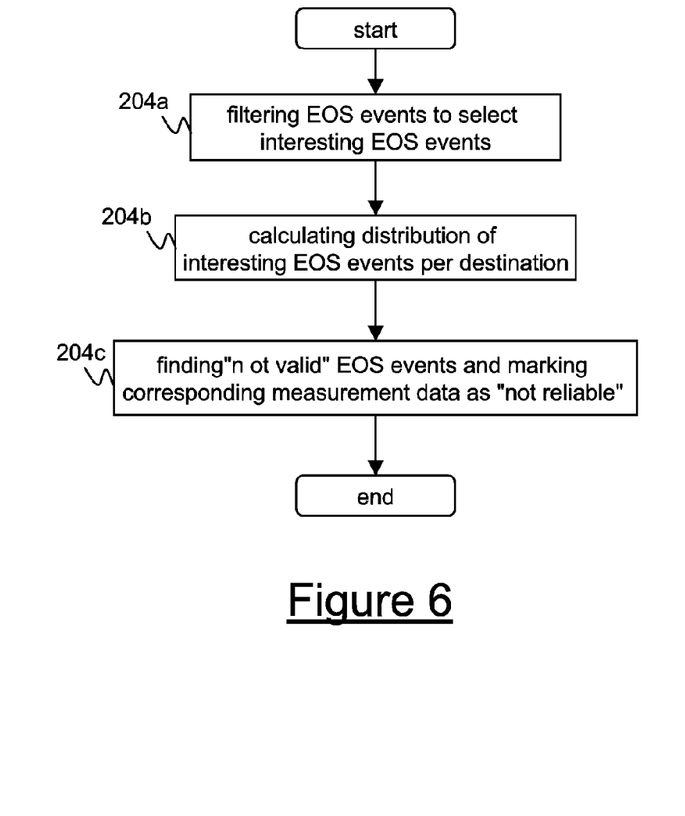
FIG. 6 schematically shows a more detailed flow chart of the step of analyzing measurement data, shown in FIGS. 2 and 3.

By referring to FIG. 6, the step 204 of analyzing collected measurement data, which is shown in FIGS. 2 and 3, will be described in further detail.

Firstly, before starting analyzing measurement data, the server EDA filters measurement data collected from each exchange, by discarding measurement data relative to EOS event types which are not considered as interesting EOS event types (for instance, measurement data relative to "network congestion" EOS events are considered, while measurement data relative to "normal" EOS events and "busy" EOS events are preferably discarded) (step 204a). Therefore, only measurement data relative to interesting EOS event types will be analyzed and possibly further detailed. As already mentioned, the list of interesting EOS events is comprised into the configuration parameters.

Then, a distribution of interesting EOS events per destination is calculated, i.e. measurement data relative to a given interesting EOS event type are inserted into a data model similar to the one of FIG. 4, so that measurement data are divided according to the n most significant digits of the callee number (step 204b). For instance, measured "network congestion" EOS events may be related only to calls addressed to callee numbers whose first two digits are "99".

Then, for each interesting EOS event type, the server EDA determines whether the interesting EOS event type is marked as "not valid". Then, measurement data relative to "not valid" interesting EOS event types are marked as "not reliable" (step 204c). Then, such "not reliable" measurement data are not analyzed, and only "reliable" measurement data are analyzed. Then, step 204 ends, and the method for monitoring network performance goes on with step 205, as shown in FIGS. 2 and 3.

Figure 7:
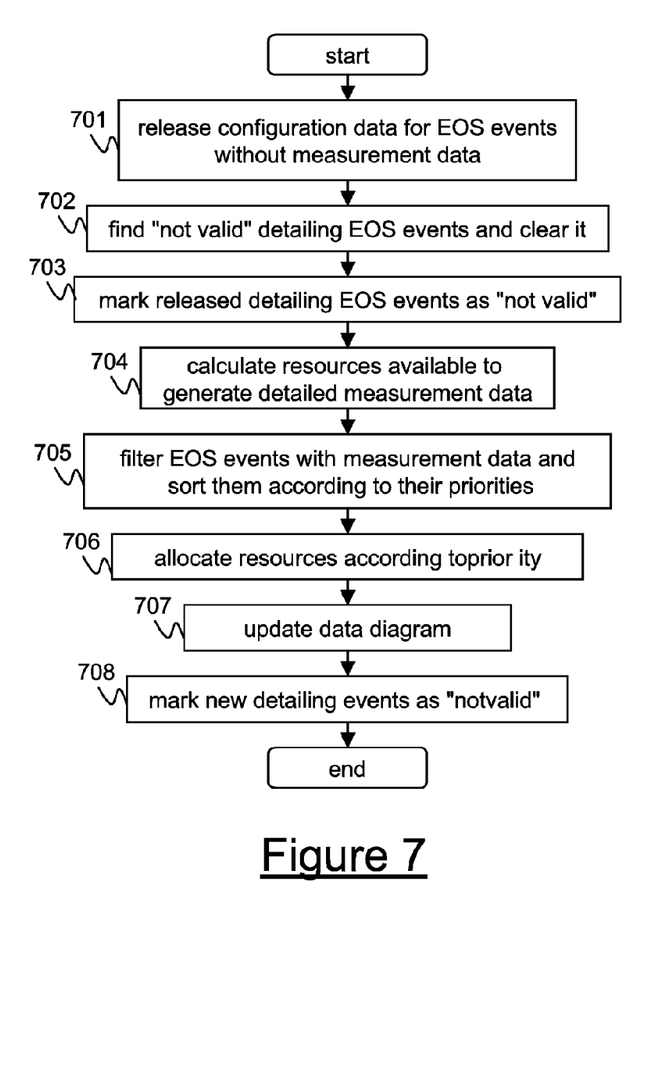
FIG. 7 schematically shows a more detailed flow chart of the step of modifying configuration parameters, shown in FIG. 3.

By referring to FIG. 7, the steps 208 and 209 of determining whether configuration parameters have to be changed, which are shown in FIG. 3, will be described in further detail.

During a first step 701, the server EDA looks in the database DB for possible interesting types of EOS events for which the number of received EOS events is zero, thus releasing resources previously allocated for analyzing measurement data relative to such EOS event types. During a second step 702, the server EDA finds EOS event types marked as "not valid" during the preceding measurement period, and it removes the flag "not valid" from these EOS event types, so that in the next measurement period measurement data relative to this type of EOS events will be considered reliable, and they will be analyzed, as shown in FIG. 5.

During a further step 703, the server EDA marks as "not valid" possible types of EOS events whose detail level must be decreased (i.e. by decreasing n), so that measurement data collected during the next measurement period will be marked as "not reliable" at step 503.

During a further step 704, the server EDA calculates the amount of resources each exchange has to allocate for generating measurement data relative to received EOS events. During a further step 705, the server EDA determines interesting types of EOS events from the next measurement period, and it assigns a priority to each interesting EOS event type.

Then, during a further step 706, the server EDA determines the amount of resources each exchange has to allocate to generate measurement data relative to each interesting type of EOS events, and allocates them according to its priority. For instance, measured "network congestion" EOS events related to call towards callee numbers whose first digits are "99" may be further detailed to the first three digits instead of the first two digits.

Then, during a step 707, the server EDA updates the data model DM for storing measurement data which will be collected during the next measurement period, by creating a separate data model for each interesting type of EOS event, and by assigning to each data model a respective number N of nodes, according to the number n of most significant digits of the callee number, according to the above equation.

Then, during step 708, the server EDA marks as "not valid" EOS events which have been found to be detailed during the current measurement period.

Therefore, step 709 ends and the method goes on in a recursive way, as shown in FIGS. 2 and 3.

Therefore, advantageously, the method allows to dynamically modify the detail level of measurement data relative to each type of EOS event by dynamically modifying configuration parameters of the EOS processing function and callee number analysis function of each exchange. This advantageously allows to collect detailed information about EOS events (in particular, about their destination) only if necessary, thus allowing to use in a very efficient way exchange resources.

The invention claimed is:

1. A method of monitoring performance of a telephone network, said telephone network comprising at least one exchange configured for collecting signaling messages which are received at said at least one exchange and/or which are generated at said at least one exchange, comprising:
   a) acquiring from said exchange a set of signaling messages indicating unsuccessful call setup procedures relative to calls addressed to a plurality of destinations;
   b) associating with each signaling message of said set of signaling messages a respective destination information which is indicative of the destination of the unsuccessful call which generated the signaling message, wherein said destination information comprises a number n of most significant digits of a callee telephone number;
   c) processing said set of signaling messages and the corresponding associated destination information, thus obtaining information relative to said unsuccessful call setup procedures according to call destinations; and
   d) acquiring configuration information from said at least one exchange, wherein said configuration information comprises said number n,
   wherein said steps a), b), and c) are periodically performed with a predetermined period, wherein the method further comprises, during a first period, changing said configuration information into modified configuration information based on said information relative to said unsuccessful call setup procedures according to call destinations, and transmitting said modified configuration information to said at least one exchange.

2. The method according to claim 1, wherein said processing comprises counting for each destination of said plurality of destinations, a respective number of signaling messages, thus obtaining, for each destination, a respective number of signaling messages indicating unsuccessful call setup procedures relative to calls addressed to said each destination.

3. The method according to claim 1, wherein said configuration information further comprises information about processing and/or memory resources allocated in said at least one exchange.

4. The method according to claim 1, wherein said configuration information comprises priority information of said signaling messages.

5. The method according to claim 1, further comprising, during a second period subsequent to said first period, marking as not reliable said information relative to said unsuccessful call setup procedures obtained during said first period.

6. The method according to claim 1, wherein changing said configuration information into modified configuration information comprises changing the number n.

7. The method according to claim 1, wherein changing said configuration information comprises changing the allocation of at least part of processing and/or memory resources in said at least one exchange.

8. The method according to claim 1, wherein said signaling messages comprise end of selection signals and wherein an end of selection signal indicates an end of a call setup procedure.

9. A device for monitoring performance of a telephone network, said telephone network comprising at least one exchange configured for collecting signaling messages which are received at said at least one exchange and/or which are generated at said at least one exchange, comprising:
   a first receiver for acquiring from said exchange a set of signaling messages indicating unsuccessful call setup procedures relative to calls addressed to a plurality of destinations;
   a first function for associating to each signaling message of said set of signaling messages respective destination information which is indicative of the destination of the unsuccessful call which generated the signaling message, wherein said destination information comprises a number n of most significant digits of a callee telephone number; and
   a second function for processing said set of signaling messages and the corresponding associated destination information, thus obtaining information relative to said unsuccessful call setup procedures according to call destinations; and
   a second receiver for acquiring configuration information from said at least one exchange wherein said configuration information comprises said number n,
   wherein said first receiver, said first function and said second function are configured for operating according to a predetermined period, wherein the device is configured for providing, during a first period, modified configuration information based on said information relative to said unsuccessful call setup procedures according to call destinations, and for transmitting said modified configuration information to said at least one exchange.

10. The device according to claim 9, wherein said second function is configured for counting, for each destination of said plurality of destinations, a respective number of signaling messages, thus obtaining, for each destination, a respective number of signaling messages indicating unsuccessful call setup procedures relative to calls addressed to said each destination.

11. The device according to claim 9, wherein said configuration information further comprises priority information of said signaling messages.

12. The device according to claim 9, further comprising a configuration for, during a second period subsequent to said first period, marking as not reliable said information relative to said unsuccessful call setup procedures obtained during said first period.

13. The device according to claim 9, comprising a configuration for changing said configuration information by changing the number n.

14. The device according to claim 9, comprising a configuration for changing the allocation of at least part of said processing and/or memory resources in said at least one exchange.

15. The device according to claim 9, wherein said signaling messages comprise end of selection signals; and wherein an end of selection signal indicates an end of a call setup procedure.

16. A telephone network comprising at least an exchange and a device according to claim 9.

17. A non-transitory computer-readable medium encoded with a computer program product, loadable in the memory of at least one computer and comprising software code portions for performing the method of claim 1.

* * * * *